UNITED STATES PATENT OFFICE.

EDWARD R. STOWELL, OF PORTLAND, INDIANA.

COMPOSITION FOR THE CONSTRUCTION OF BRICKS.

No. 819,467.     Specification of Letters Patent.     Patented May 1, 1906.

Application filed April 18, 1904. Serial No. 203,763.

*To all whom it may concern:*

Be it known that I, EDWARD R. STOWELL, of Portland, county of Jay, and State of Indiana, have discovered a new and useful Composition for the Construction of Bricks for Fireproof and Refractory Purposes, of which the following is a specification.

This composition is composed of amorphous carborundum and Portland cement.

In practice the composition is used as follows: The carborundum is mixed with ten per cent. to fifteen per cent. or more Portland cement in a perfectly dry state. The composition is then wet or moistened with water and poured or tamped into molds to give it the required form. Where the composition is poured into molds, it should remain in same for twenty-four to forty-eight hours. Where it is tamped or pressed, it can be immediately removed on pallets properly prepared for the purpose and of either wood or metal. After removing from the molds the product should be allowed to air-dry for at least thirty days.

Amorphous carborundum is formed by the action of carbon on silica at a high temperature. It is the product of the electric furnace. It is highly refractory and very hard. It is not affected by any known acids or by gases. This composition will not expand, contract, or become soft under high temperatures and is sufficiently hard to withstand injury from abrasion.

Brick from this composition, is adapted to use in all construction where a high refractory material is required or desirable.

Having described the composition, with manner of using same, what I claim as my discovery, and wish to secure by Letters Patent of the United States, is—

1. The herein-described brick composed of amorphous carborundum and Portland cement, substantially as described and for the purpose specified.

2. The herein-described composition of amorphous carborundum and Portland cement, substantially as described and for the purpose specified.

In testimony whereof I have signed my name in the presence of two subscribing witnesses.

EDWARD R. STOWELL.

Witnesses:
  WARREN F. SMITH,
  GEO. W. HALL.